June 27, 1967  J. W. L. KOHLER ETAL  3,327,486
DEVICE FOR PRODUCING COLD AT LOW TEMPERATURES
AND COLD-GAS REFRIGERATOR PARTICULARLY
SUITABLE FOR USE IN SUCH A DEVICE
Filed Jan. 21, 1965                           5 Sheets-Sheet 2

INVENTORS
JACOB W.L. KOHLER
ALBERT A. DROS
JOHANNES R. VAN GEUNS
GIJSBERT PRAST
BY
Frank R. Trifari
AGENT INVENTORS
JACOB W.L. KOHLER
ALBERT A. DROS
JOHANNES R. VAN GEUNS
GIJSBERT PRAST
BY
AGENT June 27, 1967

J. W. L. KOHLER ET AL 3,327,486
DEVICE FOR PRODUCING COLD AT LOW TEMPERATURES
AND COLD-GAS REFRIGERATOR PARTICULARLY
SUITABLE FOR USE IN SUCH A DEVICE

Filed Jan. 21, 1965

INVENTORS
JACOB W.L. KOHLER
ALBERT A. DROS
JOHANNES R. VAN GEUNS
GIJSBERT PRAST
BY

AGENT 3,327,486
DEVICE FOR PRODUCING COLD AT LOW TEMPERATURES AND COLD-GAS REFRIGERATOR PARTICULARLY SUITABLE FOR USE IN SUCH A DEVICE
Jacob Willem Laurens Kohler, Albert August Dros, Johannes Rudolphus Geuns, and Gijsbert Prast, all of Emmasingel, Eindhoven, Netherlands, assignors to North American Philips Company, Inc., New York, N.Y., a corporation of Delaware
Filed Jan. 21, 1965, Ser. No. 426,919
Claims priority, application Netherlands, Feb. 11, 1964, 6,401,114
12 Claims. (Cl. 62—6)

The invention relates to a device for producing cold at low temperatures, which comprises at least one cold-gas refrigerator. This cold-gas refrigerator comprises at least one space of variable volume, which communicates with at least one space also of variable volume, in which a higher mean temperature prevails than in the first-mentioned space, while the communication between said spaces includes one or more regenerators and a working medium flows back and forth through the regenerator(s) between said spaces, the space having the lower mean temperature communicating with an outlet duct for conducting part of the medium out of said space.

In known devices of the kind according to the present invention the medium is conducted out of the cold space in order to deliver the cold produced in the expansion space at a place located at a given distance.

The invention has for its object to produce cold at temperatures which are lower than the temperature in the space of the lower mean temperature in the cold-gas refrigerator.

In order to achieve this, the device according to the invention is characterized in that the outlet duct includes a member which conducts medium out of the working space when the presssure in the working space exceeds the minimum pressure, while the outlet duct communicates with a heat exchanger in which the medium is in thermal contact with expanded medium, after which the cooled medium flows through a conduit to a choke of expansion member, the medium being capable subsequent to expansion, of supplying cold, said device comprising a return duct for expanded medium, which communicates through the heat exchanger with the cold space and which includes a member which allows the medium to enter the cold space at a pressure lying between the minimum pressure and the pressure at the outlet.

This device has the advantage that high pressures at the expansion member can be readily attained. It is possible in this case to have the cold-gas refrigerator operate only as a compressor, but it is also possible to construct the cold-gas refrigerator so that a certain quantity of cold is produced.

A further advantage is that any impurities in the working medium are previously frozen out in the regenerator of the cold-gas refrigerator, so that these impurities cannot block the narrow ducts in the heat exchanger and in the expansion member.

In a further advantageous embodiment of the device according to the invention the outlet duct includes a member which conducts medium out of the working space when the pressure in said space is approximately at its maximum, while the return duct includes a member which allows medium to enter the cold space at a pressure which is substantially equal to the minimum pressure. In this embodiment a very high pressure ratio at the expansion or choke member can be attained.

According to a further advantageous embodiment the device according to the invention is characterized in that it comprises a further regenerator, one side (hotter) of which is in open communication with that space of the cold-gas refrigerator which has, in operation, the lower mean temperature, whereas the other (colder) side communicates with the outlet duct and the return duct.

In this embodiment the heat exchanger is replaced wholly or partly by a regenerator which is in open communication with the expansion space of the cold-gas refrigerator. This has the advantage that the heat exchange is performed at least partly with a higher efficiency. A further advantage is that although use is made of a regenerator this regenerator need not be commutatable. The regenerator is furthermore automatically balanced. The working medium is freed in the further regenerator of any impurities not yet frozen out in the regenerator of the refrigerator.

In a further advantageous embodiment of the device according to the invention the return duct includes one or more compressors, while a further heat exchanger is provided, in which the mediums entering the compressors and the medium leaving the same exchange heat.

By including compressors in the return duct a greater pressure drop across the expansion member is allowed without affecting the mean pressure level in the cold-gas refrigerator.

In a further advantageous embodiment each of the compressors is provided with a regenerator accommodated in the compression space. This has the advantage that the heat exchange is performed with higher efficiency and that no expensive, rapidly contaminated heat exchangers are longer required.

A further advantageous embodiment of the device according to the invention has the feature that one piston-like body or both of them, varying the volume of the hot space or the cold space respectively of the cold-gas refrigerator is (are) double acting, while the surface of each of these bodies remote from the working space is capable of varying the volume of a compression space, these compression spaces being includes in the return duct.

In this manner a very compact structure is obtained.

A further embodiment of the device according to the invention is that the return duct to the heat exchanger is in thermal contact with the regenerator(s) and an intermediate heat exchanger or exchangers, if any, of the cold-gas refrigerator, the return duct opening out through one or more compressors, in the space having the higher mean temperature (compression space) of the cold-gas refrigerator.

In a further advantageous embodiment the device according to the invention comprises several cold-gas refrigerators, the outlet of one refrigerators communicating with the inlet of the next-following one, so that the pressure at the outlet of one refrigerator is equal to the pressure at the inlet of the next one. In this manner a particularly high pressure ratio at the expansion space can be attained.

A further embodiment of a device according to the invention comprising several series-connected cold-gas refrigerators in which one or more cold-gas refrigerators preceding in the series combination is (are) proportioned and the volume variations of the spaces provided therein have a phase difference such that a high pressure ratio can be attained, while one or more cold-gas refrigerators following the former in the series combination is (are) proportioned and the volume variations of the relevant spaces have a phase difference such that optimum production of cold is obtained.

A device according to the invention suitable for liquefying a gas is characterized in that one or more of the cold-gas refrigerators and/or compressors is (are) provided with an inlet for the gas to be liquefied communicating with the compression space.

When the gas to be liquefied contains impurities, they will be frozen out in the regenerators. These regenerators must then of course be cleaned periodically.

According to the invention the working medium is a gas of very low boiling point, for example hydrogen or helium.

The invention furthermore relates to a cold-gas refrigerator particularly suitable for use in a device according to the invention, said refrigerator comprising at least one space of variable volume, which communicates with at least one space also of variable volume in which, in operation, a higher mean temperature prevails than in the first-mentioned space, the communication between said spaces including one or more regenerators, while the working medium flows through the regenerator(s) forward and back between said spaces, the space having the lower mean temperature being provided with an outlet for conducting part of the working medium out of said spaces and including an inlet for entering at least part of the medium conducted away.

This cold-gas refrigerator is characterized in that the outlet and the inlet are provided with members along which medium can leave the working space, when the pressure in said space exceeds the minimum pressure, while medium can enter the working space when the pressure in the working space lies between the minimum pressure and the pressure at the outlet. The members may be formed by valves or a valve in one duct and a capillary duct in the other channel.

According to a further advantageous embodiment the cold-gas refrigerator comprises a further regenerator, one side of which is in open communication with that space of the cold-gas refrigerator which, in operation, has the lower mean temperature, while the other side of said regenerator communicates with the outlet duct and the return duct.

The invention will be described more fully with reference to the drawing which shows by way of example diagrammatically several embodiments of devices for producing cold at very low temperatures.

Figure 1:
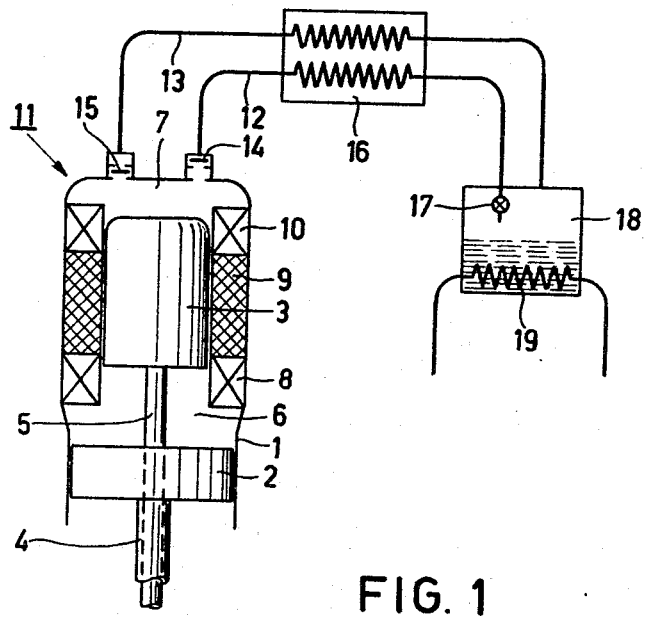
FIGS. 1 and 2 show two embodiments for producing cold at low temperatures, each of them comprising a cold-gas refrigerator, a heat exchanger and a choke member.

Referring to FIG. 1, reference numeral 1 designates a cylinder of a cold-gas refrigerator. In said cylinder a compression piston 2 and a displacer piston 3 are adapted to move with a given phase difference. The compression piston 2 and the displacer piston 3 are connected via piston rods 4 and 5 respectively with a driving gear (not shown). The piston 2 varies, during its movement, the volume of a compression space 6 and the displacer piston 3 varies, by means of its upper side, the volume of an expansion space 7. The compression space 6 communicates through a cooler 8, a regenerator 9 and a freezer 10 with the expansion space 7. The compression space 6 has, in operation a much higher mean temperature than the expansion space 7.

The cold head 11 of the refrigerator communicates with a medium outlet duct 12 and a medium inlet duct 13. Said ducts include an outlet valve 14 and an inlet valve 15. Said valves may be conventional one-way valves. As an alternative, said valves may be formed by controlled valves. It is furthermore possible to replace one of said valves by a capillary duct.

The medium outlet duct 12 passes through the heat exchanger 16 to a choke cock 17. The medium condensed in the choke cock 17 is collected in a storage vessel 18, in which a cooling spiral 19 is arranged through which the medium to be cooled can be conveyed. The expanded, vapourous medium flows through the duct 13 back to the expansion space 7.

The device operates as follows: It is filled with such a quantity of low-boiling point medium for example hydrogen or helium, which has a given mean pressure in the device. The compression piston 2 compresses and expands alternately the medium in the refrigerator, while the displacer piston conveys the medium alternately from the compression space 6 to the expansion space 7. The outlet valve 14 is adjusted so that when the pressure is substantially at its maximum it is opened. The cold medium from the expansion space 7 then enters the duct 12. This medium is conveyed further in the heat exchanger 16 and then expanded in the choke cock 17. The medium will then partly condense. The expanded, very cold medium is brought into thermal contact with a medium to be cooled in the spiral 19. The evaporated medium of lower pressure then flows through the heat exchanger 16 back to the inlet valve 15. This valve is adjusted so that it is opened when the pressure in the expansion space 7 is approximately at its minimum. It will be obvious that the valves may, if desired, be adjusted in a different manner, so that at the outlet the pressure is lower and at the inlet there is a higher pressure than the minimum pressure. However, this results in that at the choke cock a smaller pressure drop prevails, so that the expansion is smaller.

In this device it is possible to have the cold-gas refrigerator operate as a compressor by the choice of the phase difference between the piston 2 and the displacer piston 3 or to have the refrigerator produce, in addition, an amount of cold. If the cold-gas refrigerator has to operate mainly as a compressor, the phase difference is chosen to be between 130° and 180° between the movements of the piston and the displacer piston. If, on the contrary, the cold-gas refrigerator has to produce, in addition, an amount of cold, a phase difference of 60° to 90° between the movements of the piston and the displacer piston is desired.

Although it is stated in the foregoing that during choking in the cook 17 part of the medium condenses, it will be obvious that expansion may be performed without involving condensation by a suitable choice of the pressures and the temperatures. In this case the choke cock may be replaced by an expansion machine.

In the foregoing, it is assumed that the whole quantity of expanded medium flows back through the duct 13 to the refrigerator. However, part of the expanded medium may be drained from the vessel 18 for example in the form of the condensate. This involves a reduction of the total quantity of medium in the device. Fresh medium may be replenished in the compression space 6 during the suction stroke of the piston 2.

Figure 2:
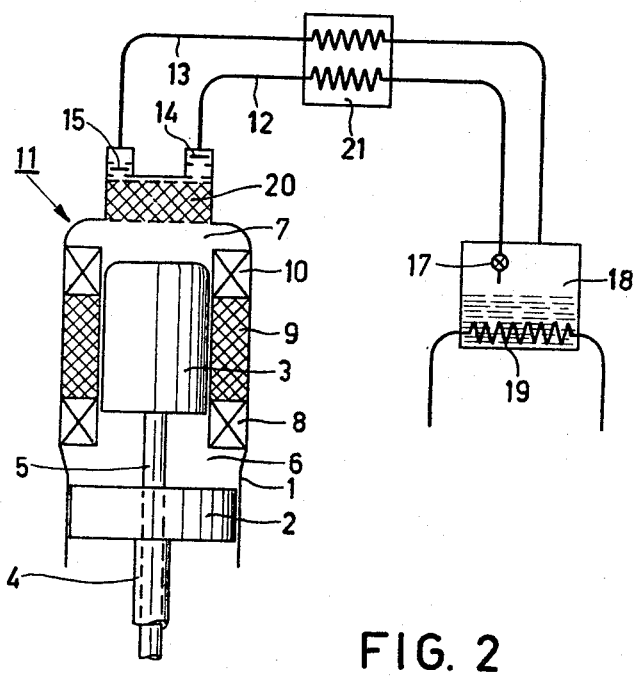

FIG. 2 shows a device which corresponds as regards its operation with the device shown in FIG. 1. The difference consists in that the cold head of the refrigerator comprises a further regenerator 20. This has the advantage that the heat exchange between the compressed medium flowing to the choke cock 17 and the expanded medium is mainly performed in the regenerator 20. It is known that the heat exchange is performed in a regenerator with a higher efficiency than in a heat-exchanger. The expensive, complicated heat exchanger 16 may then be replaced by a much smaller, cheaper heat exchanger 21. In the extreme case the heat exchanger may be completely dispensed with.

A further advantage of the regenerator 20 is that any impurities not yet frozen out in the regenerator 9 will be collected in the regenerator 20, so that there is no longer any risk of the choke cock being clogged by freezing.

Figure 3:
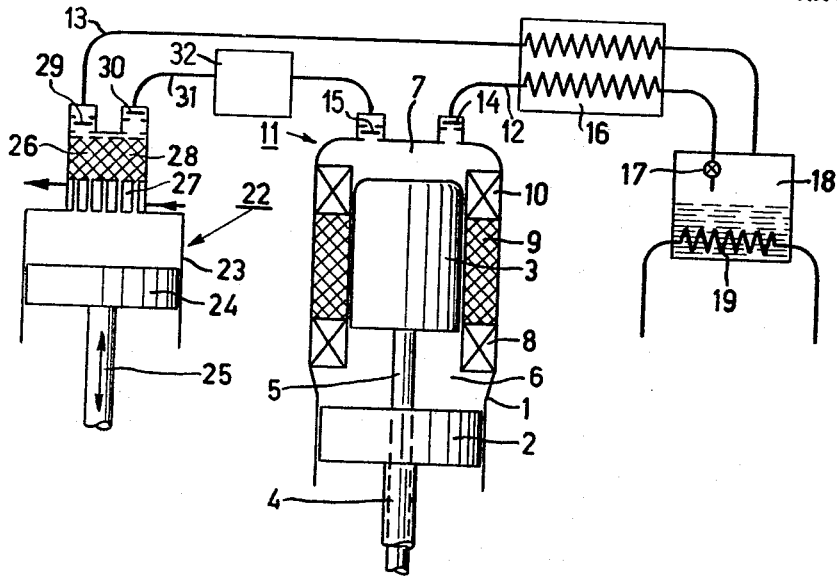
FIGS. 3, 4 and 5 show two devices for producing cold at low temperatures in a diagrammatical view. These devices correspond with those shown in FIGS. 1 and 2, but the return duct comprises a compressor.

FIG. 3 shows a device for producing cold at low temperatures. In this device the parts described with reference to the foregoing figures are designated by the same reference numerals.

In this device the return duct 13 includes a compressor 22. This compressor comprises a cylinder 23 with a piston 24 adapted to move therein. The piston 24 is connected by a piston rod 25 with a driving gear (not shown). The cylinder 23 is provided at its head face with a further cylindrical portion 26 accommodating a cooler 27 for conducting away the compression heat and a regenerator 28. On the side remote from the compression space there are provided the inlet valve 29 and the outlet valve 30. The outlet valve 30 communicates with a duct 31, which includes a buffer space 32. The duct 31 opens out through an inlet valve 15 in the expension space 7 of the refrigerator.

The advantage of the compressor 22 is that the pressure drop across the choke cock 17 may be much greater.

The particular construction of the compressor 22 with a regenerator in the compression space has the advantage that the heat exchange between the gases flowing in and out is performed with satisfactory efficiency. The compression piston has substantially the ambient temperature so that no difficuties in packing and the like are involved.

Figure 4:
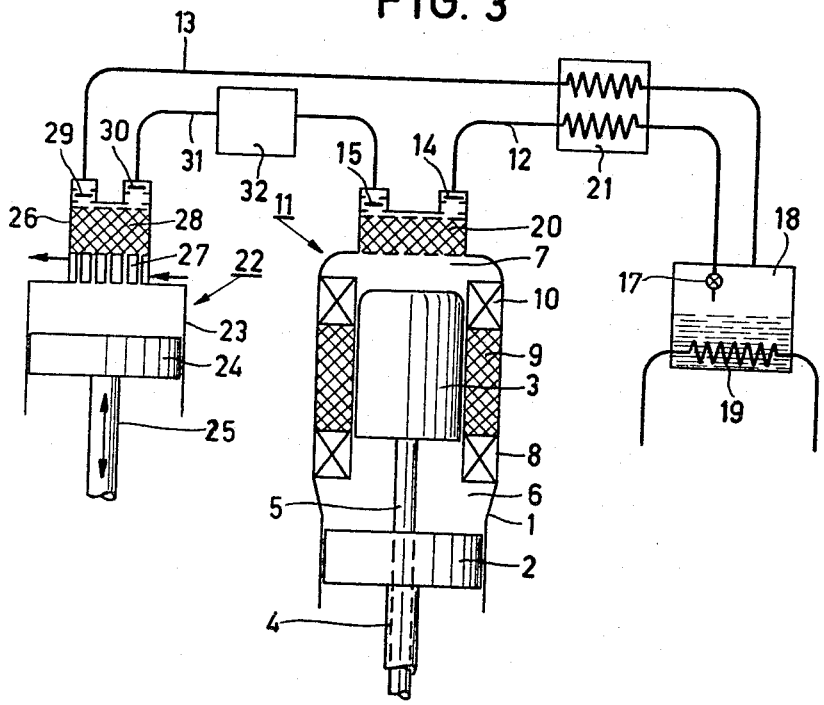

FIG. 4 shows a device corresponding with that of FIG. 3, while in the device shown in FIG. 2 the head of the cold-gas refrigerator comprises a further regenerator. The advantage is that the heat exchanger 16 may be almost completely dispensed with.

Figure 5:
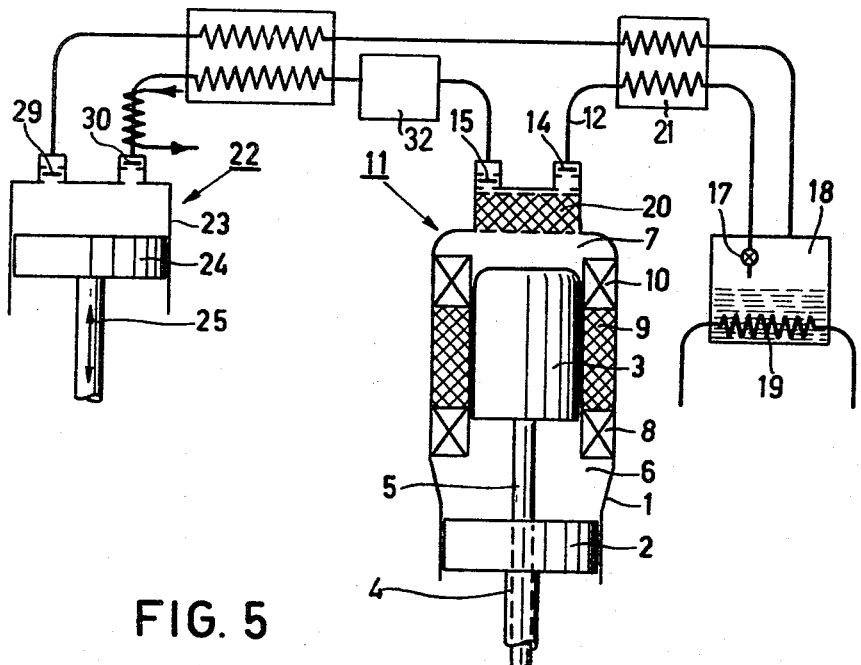

Although, it is advantageous, as is shown in FIG. 3, to use a compressor with an incorporated regenerator, use may be made of a conventional compressor combined with a heat exchanger. This device is shown in FIG. 5.

Figure 6:
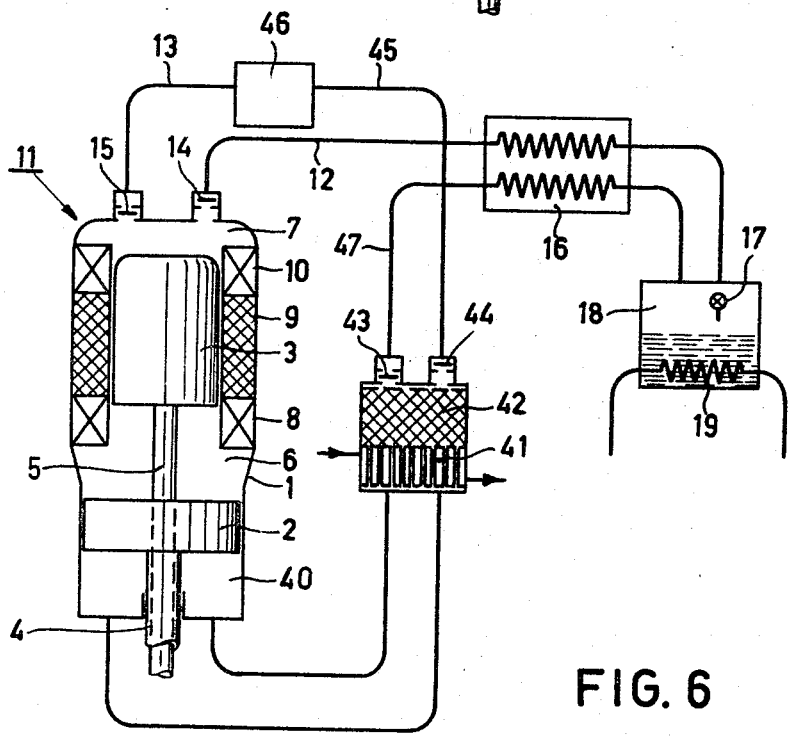
FIGS. 6 and 7 show devices for producing cold at low temperatures in which the compression piston of the cold-gas refrigerator is double acting.

FIG. 6 shows a slightly different embodiment of the invention. In this construction the compression piston 2 of the cold-gas refrigerator is double acting. By one side it varies the volume of the compression space 6 and by the other side it varies the volume of a further compression space 40. The compression space 40 is in open communication with the cooler 41 and the regenerator 42. On the side of the regenerator 42 remote from the compression space 40 there are arranged the inlet valve 43 and the outlet valve 44. The outlet valve 44 communicates with a duct 45, which communicates through a buffer vessel 46 with the expansion space 7. The inlet valve 43 communicates with the return duct 47, which conveys the medium evaporated in the vessel 18 through the heat exchanger 16 to the compression space 40. In principle this device is substantially the same as the embodiment illustrated in FIG. 3, only the construction is much more compact.

It will be obvious that in this device the heat exchanger 16 may be replaced by a regenerator included in the head of the refrigerator.

Figure 7:
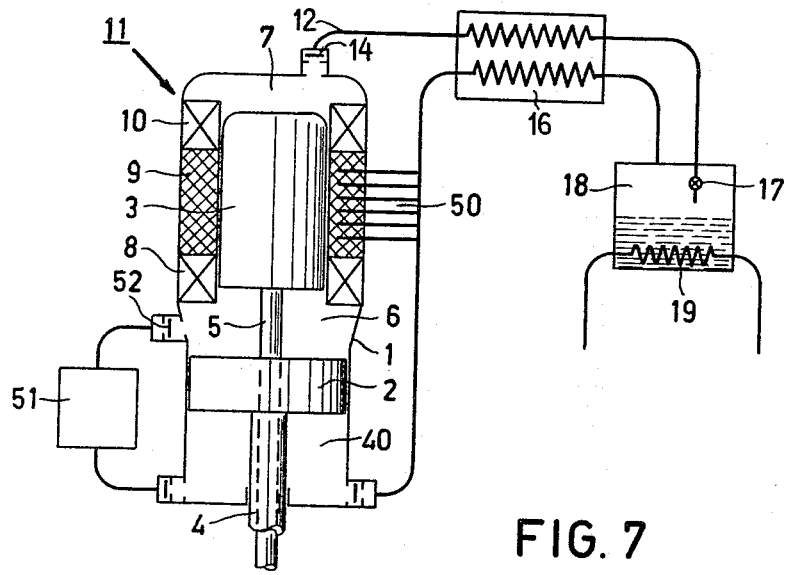

FIG. 7 shows a device for producing cold at low temperatures in which, like in the device of FIG. 6 the compression piston 2 of the cold-gas refrigerator is double acting. The medium evaporated in the vessel 18 is not conveyed back in this device to the expansion space 7, but travels through the heat exchanger 16 and the heat exchanger 50, where the expanded medium exchanges heat with the regenerator 9, to the compression space 40. After compression in said space the medium travels, subsequent to having given off the compression heat, to the buffer space 51 and then through the inlet valve 52 to the compression space 6 of the cold-gas refrigerator.

Figure 8:
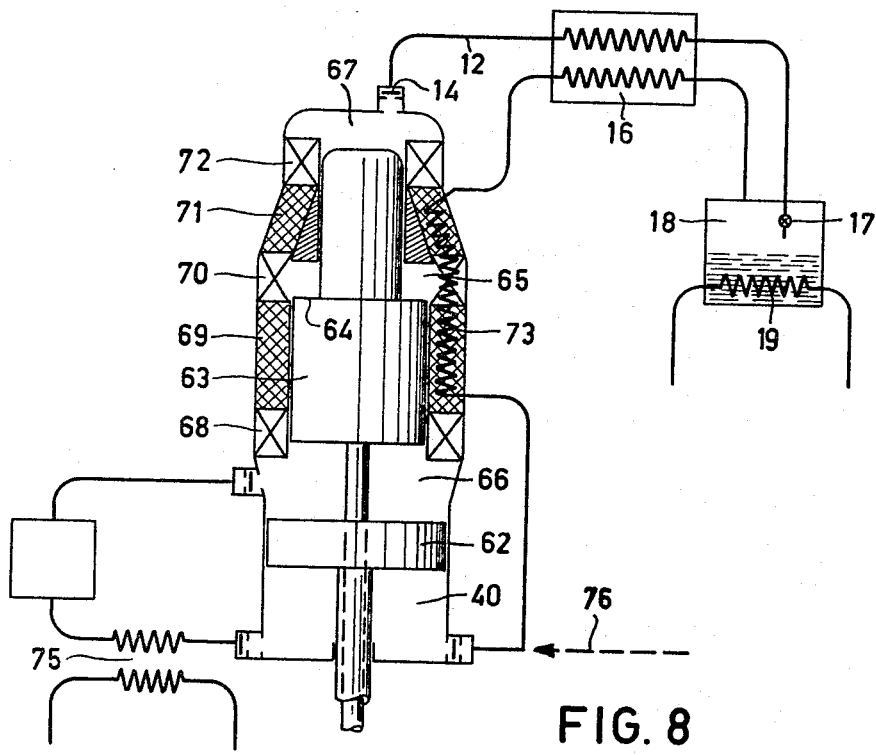
FIG. 8 shows a device for producing cold at low temperatures which comprises a refrigerator having a stepped displacer piston.

FIG. 8 shows diagrammatically a device for producing cold at low temperatures, in which the cold-gas refrigerator is formed by a so-called multispace machine. Such a multispace machine may also be employed in the embodiments described above. Also this refrigerator comprises a piston 62 and a displacer piston 63, which move with a phase difference. The displacer piston 63 comprises two portions of different diameters. Thus an annular face 64 is formed, which is caable of varying the volume of a space 65. In the communication between the compression space 66 and the expansion space 67 there are provided a cooler 68, a regenerator 69, an intermediate heat exchanger 70, a second regenerator 71 and a freezer 72. The further construction of the device is similar to that of FIG. 7. The expanded medium flowing back through the heat exhanger 16 is brought into thermal contact in the heat exchanger 73 with the second regenerator 71, the intermediate heat exchanger 70 and the regenerator 69. The medium, which then has substantially the temperature of the cooling water, is compressed in the compression space 40, freed from the compression heat in the cooler 75 and then conducted into the compression space 66. When condensate is drained from the vessel 18 fresh medium may be replenished for example at 76.

Figure 9:
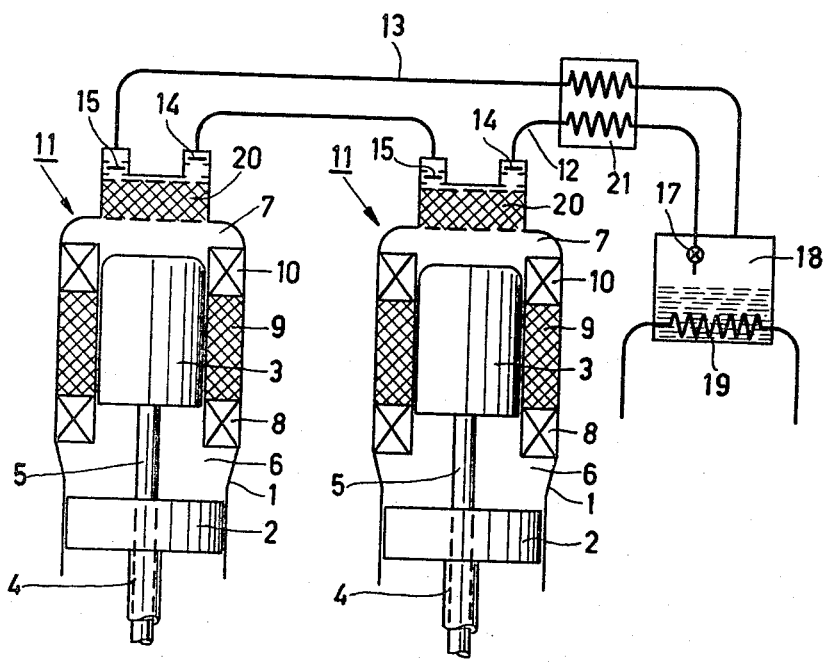
FIG. 9 shows a device for producing cold at low temperatures, in which two series-connected cold-gas refrigerators are provided.

FIG. 9 finally shows a device for producing cold at low temperatures, in which two cold-gas refrigerators are connected in series. After the foregoing this figure need not be explained more fully. It should only be noted that the outlet pressure of the first refrigerator is, of course, equal to the pressure at the inlet of the second refrigerator.

In all the foregoing embodiments, where no buffer vessels are shown, it is assumed that the duct system and the expansion vessel have a sufficient volume for allowing a continuous expansion across the choke device.

It should furthermore be noted that a pulrality of refrigerators may be connected in parallel with each other. The outlets then communicate with a common buffer vessel and the inlets communicate with a common buffer vessel for expanded medium.

The invention, therefore, results in the production of cold at very low temperatures by means of a compartively simple arrangement.

What is claimed is:

1. An apparatus for producing cold at low temperatures comprising at least one cold-gas refrigerator having at least one space of variable volume and lower mean temperature, a separate space of variable volume and higher mean temperature than said one space and communicating with the latter, said communicating means including at least one regenerator therein, a working medium adapted to flow through said regenerator and said spaces, an outlet duct connected to the space having the lower mean temperature for conducting part of said working medium out of said space, said outlet duct having a member which conducts some of said working medium out of said working space when the pressure therein exceeds the minimum pressure, a heat exchanger connected to said outlet duct, a further duct having an expansion device therein connected to said heat exchanger, a storage receptacle having said expansion device therein, said working medium forming an expanded medium in said expansion device, said expanded medium after expansion supplying cold, and a return duct for said expanded medium connected to said storage receptacle and which communicates through said heat exchanger with said space of lower mean temperature and includes a member which permits said expanded medium to enter said space of lower mean temperature at a prevailing pressure between the minimum pressure and the pressure at said outlet duct, said expanded medium in said heat exchanger being in thermal contact with the counter current working medium.

2. An apparatus for producing cold at low temperatures as claimed in claim 1 wherein said outlet duct is provided with a member which conducts medium out of said space of lower mean temperature when the pressure in said space is substantially at its maximum, and the return duct having said member which permits medium to enter said space of lower mean temperature at a pressure which is substantially equal to said minimum pressure.

3. An apparatus for producing cold at low temperature as claimed in claim 1 further comprising an additional regenerator, the warmer side of which being in open communication with the space of the cold-gas refrigerator having in operation the lower mean temperature, and the colder side of said regenerator communicating with the outlet duct and the return duct.

4. An apparatus for producing cold at low temperatures as claimed in claim 1 wherein said return duct includes at least one compressor, and another heat exchanger is provided in which the medium entering the compressor and the medium leaving said compressor are in heat exchanging relationship therewith.

5. An apparatus for producing cold at low temperatures as claimed in claim 4 wherein said compressor is provided with a regenerator housed in the compression space of said compressor.

6. An apparatus for producing cold at low temperatures as claimed in claim 4 having a compression space in said return duct and wherein said cold-gas refrigerator is provided with a cylinder, at least one double-acting, reciprocating piston in said cylinder varying the volumes of said spaces of lower mean temperature and higher mean temperature respectively, and the surface of said piston remote from the working space being capable of varying the volume of said compression space.

7. An apparatus for producing cold at low temperatures as claimed in claim 1 wherein a plurality of cold-gas refrigerators are arranged in series with the outlet of one refrigerator communicating with the inlet of the succeeding refrigerator, and the pressure at the outlet of one refrigerator is equal to the pressure at the inlet of the succeeding refrigerator.

8. An apparatus for producing cold at low temperatures as claimed in claim 7 wherein at least one of said cold-gas refrigerators has a volume variation of the spaces therein having a phase difference such that a high pressure ratio can be attained, and at least one cold-gas refrigerator in which the volume variations of the spaces therein has a phase difference such that the cold production is at the optimum.

9. An apparatus for producing cold at low temperatures as claimed in claim 1 wherein at least one cold-gas refrigerator is provided with an inlet for the gas to be liquefied communicating with the corresponding compression space.

10. An apparatus for producing cold at low temperatures as claimed in claim 1 wherein the working medium is constituted of a gas of a very low boiling point.

11. An apparatus for producing cold at low temperatures comprising at least one cold-gas refrigerator having at least one space of variable volume and lower mean temperature, a separate space of variable volume and higher mean temperature than said one space and communicating with the latter, said communicating means including at least one regenerator therein, a working medium adapted to flow through said regenerator and said spaces, an outlet duct connected to the space having the lower mean temperature for conducting part of said working medium out of said space, said outlet duct having a member which conducts some of said working medium out of said working space when the pressure therein exceeds the minimum pressure, a heat exchanger connected to said outlet duct, a further duct having an expansion device therein connected to said heat exchanger, a storage receptacle having said expansion device therein, said working medium forming an expanded medium in said expansion device, said expanded medium after expansion supplying cold, and a return duct for said expanded medium connected to said storage receptacle and which communicates through said heat exchanger with said regenerator, an inlet for permitting at least part of the expanded medium into said apparatus, and said expanded medium entering into one of said spaces when the pressure therein lies between the minimium pressure and the pressure at the outlet.

12. An apparatus for producing cold at low temperatures comprising at least one cold-gas refrigerator having at least one space of variable volume and lower mean temperature, a separate space of variable volume and higher mean temperature than said one space and communicating with the latter, said communicating means including at least one regenerator therein, an additional regenerator, an outlet duct connected to the space having the lower mean temperature through said additional regenerator, a working medium adapted to flow through said regenerators and said spaces, said outlet duct having a member which conducts some of said medium out of said working space when the pressure therein exceeds the minimum pressure, said outlet duct provided with an expansion device therein, the cooled medium thereafter flowing through said outlet duct to said expansion device, the medium after expansion supplying cold, and a return duct for said expanded medium which communicates through said heat exchanger with said space of lower mean temperature and includes a member which permits said medium to enter said space of lower mean temperature at a prevailing pressure between the minimum pressure and the pressure at said outlet duct.

References Cited

UNITED STATES PATENTS

| | | | |
|---|---|---|---|
| 2,764,877 | 10/1956 | Kohler | 62—6 |
| 2,907,175 | 10/1959 | Kohler | 62—6 |
| 3,091,092 | 5/1963 | Dros | 62—6 |
| 3,101,596 | 8/1963 | Rinia | 62—6 |
| 3,115,014 | 12/1963 | Hogan | 62—6 |
| 3,115,015 | 12/1963 | Hogan | 62—6 |
| 3,115,016 | 12/1963 | Hogan | 62—6 |
| 3,148,512 | 9/1964 | Hoffman | 62—6 |
| 3,274,786 | 9/1966 | Hogan et al. | 62—6 |

WILLIAM J. WYE, *Primary Examiner.*